(12) United States Patent
Torii et al.

(10) Patent No.: US 7,362,674 B2
(45) Date of Patent: Apr. 22, 2008

(54) DEFECT DETECTION APPARATUS

(75) Inventors: Toshihiro Torii, Uji (JP); Teruhiko Izumi, Hirakata (JP)

(73) Assignee: Matsushita Electric Industrial Co., Ltd, Osaka (JP)

(*) Notice: Subject to any disclaimer, the term of this patent is extended or adjusted under 35 U.S.C. 154(b) by 532 days.

(21) Appl. No.: 10/989,466

(22) Filed: Nov. 17, 2004

(65) Prior Publication Data

US 2005/0111323 A1    May 26, 2005

(30) Foreign Application Priority Data

Nov. 18, 2003    (JP)  ............................. 2003-388496

(51) Int. Cl.
*G11B 7/00*    (2006.01)

(52) U.S. Cl. ................................. 369/53.15

(58) Field of Classification Search ................ None
See application file for complete search history.

(56) References Cited

U.S. PATENT DOCUMENTS 7,023,777 B2 * 4/2006 Miyazaki et al. ........ 369/53.13
7,230,897 B2 * 6/2007 Izumi ..................... 369/53.15

FOREIGN PATENT DOCUMENTS

JP    2003-196853    7/2003

* cited by examiner

*Primary Examiner*—Thang V. Tran
*Assistant Examiner*—Adam R. Giesy
(74) *Attorney, Agent, or Firm*—Wenderoth, Lind & Ponack, L.L.P.

(57) ABSTRACT

During a predetermined period of time after the operation of an optical disc drive has changed from recording to playback or from playback to recording, a first monomulti circuit outputs a pulse signal according to the operation change of the optical disc drive. On receipt of the pulse signal, a capacitor included in an integration circuit is short-circuited at a predetermined reference voltage to fix the output value of the integration circuit at the reference voltage. After the period has passed, on receipt of a pulse signal outputted from a second monomulti circuit, a resistor included in the integration circuit is short-circuited, and an envelope signal is integrated with a time constant being reduced, whereby detection of a false defect signal is avoided, and defect detection can be speedily restarted.

8 Claims, 10 Drawing Sheets

DEFECT DETECTION APPARATUS

FIELD OF THE INVENTION

The present invention relates to a defect detection apparatus which is used in an optical disc drive or the like and, more particularly, to a defect detection apparatus which accurately performs defect detection immediately after the operation of the optical disc drive has been changed from recording to playback or from playback to recording.

BACKGROUND OF THE INVENTION

In recent years, as the amount of information has significantly been increased in a computer system, a large-capacity, high-speed, and random-accessible optical disc drive has come into wide use as an information data recording/playback apparatus, and optical discs such as CD-R, CD-RW, DVD-R/RW, and DVD-RAM have been used as recording media.

Such optical disc drive employs a defect detection apparatus for detecting a defect that is an area where writing or reading in/from the optical disc is not normally carried out. More specifically, when a light beam is converged and applied onto the optical disc, the defect detection apparatus detects a change in envelope of a reflection signal which is obtained in accordance with the intensity of the light reflected at the optical disc, thereby to detect a defect on the optical disc, and outputs a defect detection signal indicating whether there is a defect or not. The defect detection signal is used as a signal for previous value hold by a servo circuit that controls tracking and focusing on the optical disc, or it is used for obtaining an extraction signal that is used for judging a non-writable area on the optical disc, using a CPU that is incorporated in the optical disc drive to carry out various kinds of controls (for example, Japanese Published Patent Application No. 2003-196853).

A conventional defect detection apparatus will be described with reference to FIG. 9. FIG. 9 is a block diagram illustrating the construction of the conventional defect detection apparatus. In FIG. 9, reference numeral 1000 denotes a variable gain amplifier for amplifying, with a predetermined gain, a reflection signal AS according to the intensity of light reflected at an optical disc when a light beam is converged and applied onto the optical disc. The variable gain amplifier 1000 is supplied with a write gate signal WTGT indicating whether the optical disc drive carries out recording or playback. Reference numeral 1001 denotes a high-speed envelope detection circuit for detecting an envelope of an output signal AP of the variable gain amplifier 1000 (hereinafter referred to as an amplifier output signal). Reference numeral 1002 denotes an integration circuit for integrating an output signal EM of the high-speed envelope detection circuit 1001. Reference numeral 1003 denotes a slice level setting circuit for setting a slice level SD as a reference signal to be used in a comparator 1004 described later, on the basis of the output signal of the integration circuit 1002. Reference numeral 1004 denotes a comparator for comparing the output signal EM of the high-speed envelope detection circuit 1001 with the slice level SD, thereby to output a defect detection signal DD.

Next, the operation of the conventional defect detection apparatus constructed as described above will be described with reference to FIGS. 9 and 10. FIG. 10 shows the waveforms of the respective signals to be output in the defect detection apparatus shown in FIG. 9.

Initially, the reflection signal AS is input to the variable gain amplifier 1000. Since level of the reflection signal AS varies according to whether the optical disc is during recording or during playback, the variable gain amplifier 1000 amplifies the reflection signal AS to a predetermined amplitude, with a predetermined gain according to the operation of the optical disc drive, on the basis of the write gate signal WTGT, so as to prevent the level difference from being detected as a change in the envelope, and supplies an amplifier output signal AP to the high-speed envelope detection circuit 1001.

Next, the high-speed envelope detection circuit 1001 detects the envelope of the inputted amplifier output signal AP, and outputs an envelope signal EM to the integration circuit 1002 and the comparator 1004. The integration circuit 1002 integrates the output signal EM of the high-speed envelope detection circuit 1001, and outputs a signal IS to the slice level setting circuit 1003.

Next, the slice level setting circuit 1003 converts the level of the output signal IS of the integration circuit 1002 into a slice level SD, and outputs the slice level SD to the comparator 1004.

When there is a defect on the optical disc, usually, the levels of the reflection signal AS and the amplifier output signal AP steeply drop as shown in FIG. 10. Since the waveform of the envelope signal EM outputted from the high-speed envelope detection circuit 1001 follows the waveform of the amplifier output signal AP, the level of the envelope signal EM becomes approximately equal to the level of the amplifier output signal AP. On the other hand, since the time constant of the integration circuit 1002 is smaller than that of the high-speed envelope detection circuit 1001, the waveform of the output signal of the integration circuit 1002 does not follow the steep level drop of the envelope signal EM, but changes gently as shown in FIG. 10.

Next, the comparator 1004 compares the envelope signal EM with the slice level SD, and outputs, as a defect detection signal DD, a pulse TS1 indicating that a defect is detected, when the envelope signal EM becomes lower than the slice level SD.

However, since the gain set value of the variable gain amplifier 1000 has some degree of variation or the like, it is difficult for the variable gain amplifier 1000 to completely remove the level difference between the reflected light during recording of the reflection signal AS and the reflected light during playback thereof. Therefore, when the operation to the optical disc is changed from recording to playback or from playback to recording, there is a possibility that a level difference might occur as in the output signal AP of the variable gain amplifier 1000 shown in FIG. 10. In the conventional defect detection apparatus, such level difference causes problems as follows.

When the operation to the optical disc is changed from recording to playback, the envelope signal EM outputted from the high-speed envelope detection circuit 1001 follows the level drop of the reflection signal AS. However, the output signal IS of the integration circuit 1002, which is obtained by integrating the envelope signal EM, changes gently as shown in FIG. 10, and it takes time to follow the level drop of the reflection signal AS. Therefore, the output signal SD of the slice level setting circuit 1003 exceeds the output signal EM of the high-speed envelope detection circuit 1001, and the comparator 1004 outputs an incorrect defect detection signal FS (hereinafter referred to as "false defect signal") immediately after the operation of the optical disc drive has changed from recording to playback although there is no defect on the optical disc.

Further, when the operation to the optical disc has changed from playback to recording, no false defect signal FS is output, but it is difficult to carry out accurate defect detection during a period tF in the defect detection signal DD shown in FIG. 10.

SUMMARY OF THE INVENTION

The present invention is made to solve the above-described problems and has for its object to provide a defect detection apparatus that can accurately and speedily detect a defect immediately after the operation of the optical disc drive has been switched between recording and playback.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a defect detection apparatus comprises an amplifier circuit for amplifying a reflection signal which is obtained according to the intensity of reflected light of a light beam that is applied onto an optical disc, on the basis of a control signal indicating whether an optical disc drive performs playback or recording, with a gain according to the operation of the optical disc drive; an envelope detection circuit for obtaining an envelope of an output signal of the amplifier circuit; a first pulse generation circuit for outputting a pulse of a predetermined length every time the control signal is changed; an integration circuit for integrating the output signal of the envelope detection circuit with a predetermined time constant, with its output value being changed during a period when it receives the pulse outputted from the first pulse generation circuit; a slice level setting circuit for setting, on the basis of an output signal from the integration circuit, a slice level used when detecting a defect detection signal indicating presence/absence of a defect on the optical disc; and a comparator for comparing the output signal of the envelope detection circuit with the slice level, to output the defect detection signal.

According to a second aspect of the present invention, in the defect detection apparatus according to the first aspect, the integration circuit includes a resistor, and output a signal that is obtained by integrating the envelope signal from the envelope detection circuit with a time constant obtained by short-circuiting the resistor, during a period when the integration circuit receives the pulse outputted from the first pulse generation circuit.

According to a third aspect of the present invention, in the defect detection apparatus according to the second aspect, the integration circuit includes a switch which is connected in parallel to the resistor, and controlled by the pulse outputted from the first pulse generation circuit.

According to a fourth aspect of the present invention, the defect detection apparatus according to the third aspect further includes a slice level switching circuit for changing the slice level that is set by the slice level setting circuit to a predetermined slice level, during a period when the slice level switching circuit receives the pulse outputted from the first pulse generation circuit.

According to a fifth aspect of the present invention, in the defect detection apparatus according to the first aspect, the integration circuit includes a capacitor, and outputs a predetermined reference voltage by short-circuiting the capacitor, during a period when the integration circuit receives the pulse outputted from the first pulse generation circuit.

According to a sixth aspect of the present invention, in the defect detection apparatus according to the fifth aspect, the integration circuit includes a switch which is located between the capacitor and the predetermined reference voltage, and controlled by the pulse outputted from the first pulse generation circuit.

According to a seventh aspect of the present invention, the defect detection apparatus according to the first aspect further including a second pulse generation circuit for outputting a pulse of a predetermined length when the first pulse generation circuit has finished outputting the pulse; wherein said integration circuit includes a resistor and a capacitor, and outputs a predetermined reference voltage by short-circuiting the capacitor during a period when it receives the pulse outputted from the first pulse generation circuit, and output a signal that is obtained by integrating the envelope signal from the envelope detection circuit with the time constant obtained by short-circuiting the resistor during a period when it receives the pulse outputted from the second pulse generation circuit.

According to an eighth aspect of the present invention, in the defect detection apparatus according to the seventh aspect, the integration circuit includes a switch that is located between the capacitor and the predetermined reference voltage, and controlled by the pulse outputted from the first pulse generation circuit; and a switch that is connected in parallel to the resistor, and controlled by the pulse outputted from the second pulse generation circuit.

As described above, in the defect detection apparatus according to the present invention, the output of the integration circuit is fixed to a reference voltage during a predetermined period after the operation of the optical disc drive has changed from playback to recording or from recording to playback, and the slice level that is set with reference to the output value is compared with the level of the envelope signal to output a defect detection signal. Therefore, the envelope signal is prevented from erroneously becoming lower than the slice level, thereby reducing occurrences of false defect signals during the above-mentioned period. Further, during a predetermined period after the above-mentioned period has ended, the envelope signal is integrated with the time constant of the integration circuit being reduced so that the change in the waveform of the output signal IS from the integration circuit quickly follows the change in the waveform of the envelope signal EM, whereby defect detection can be speedily restarted.

DETAILED DESCRIPTION OF THE PREFERRED EMBODIMENTS

Embodiment 1

Figure 1:
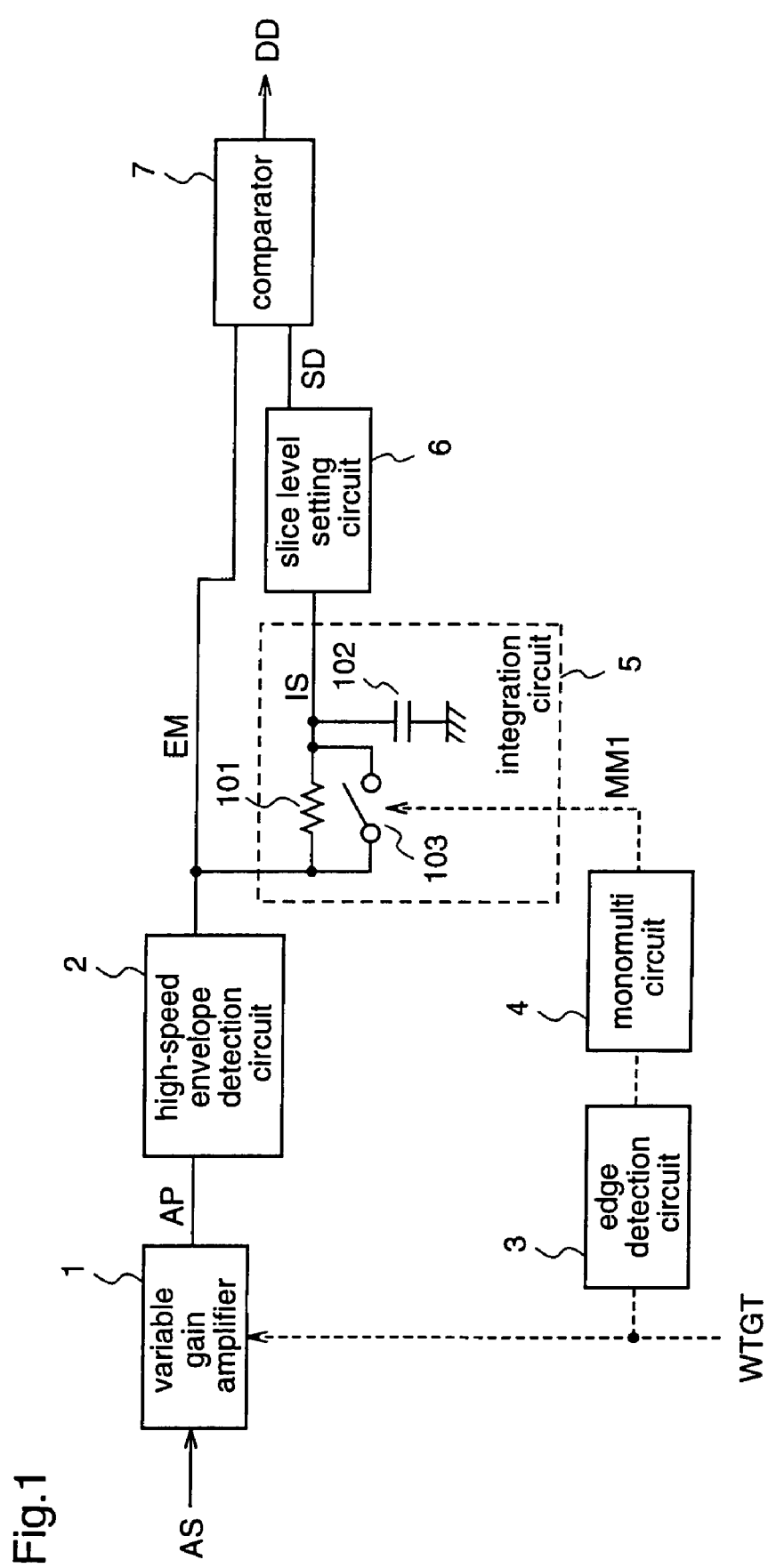
FIG. 1 is a block diagram illustrating a defect detection apparatus according to a first embodiment of the present invention.

FIG. 1 is a block diagram illustrating the construction of a defect detection apparatus according to a first embodiment of the present invention.

In FIG. 1, reference numeral 1 denotes a variable gain amplifier as an amplifier circuit for amplifying a reflection signal AS which is obtained according to the intensity of reflected light of a light beam applied onto an optical disc. The variable gain amplifier 1 is supplied with a write gate signal WTGT indicating whether the operation of an optical disc drive is recording or playback. Hereinafter, it is assumed that the write gate signal WTGT is "H" during recording onto the optical disc, and "L" during playback from the optical disc. Reference numeral 2 denotes a high-speed envelope detection circuit as an envelope detection circuit for detecting an envelope of an output signal AP of the variable gain amplifier 1. The high-speed envelope detection circuit 2 is a typical detector, and obtains an upper envelope of the output signal AP of the variable gain amplifier 1 (hereinafter referred to as "amplifier output signal"). Reference numeral 3 denotes an edge detection circuit for outputting a pulse to a monomulti circuit 4 described later, according to change in the signal level of the write gate signal WTGT. Reference numeral 4 denotes a monomulti circuit as a first pulse generation circuit which receives the pulse outputted from the edge detection circuit 3, generates a pulse of a predetermined length, and outputs the pulse to an integration circuit 5 described later. Reference numeral 5 denotes an integration circuit for integrating an output signal EM of the high-speed envelope detection circuit 2. The integration circuit 5 is provided with a resistor 101, a capacitor 102, and a switch 103 which is connected in parallel to the resistor 101. An end of the resistor 101 is supplied with the envelope signal EM, and the other end is connected to a slice level setting circuit 6 described later and to an end of the capacitor 102. The other end of the capacitor 102 is grounded. The switch 103 is controlled by a pulse signal MM1 outputted from the monomulti circuit 4. The switch 103 is turned on when the level of the pulse signal MM1 is "H", and turned off when the level of the pulse signal MMI is "L". Reference numeral 6 denotes a slice level setting circuit for setting a slice level as a reference signal to be used in a comparator 7 described later, on the basis of an output signal IS of the integration circuit 5. Reference numeral 7 denotes a comparator for comparing the output signal EM of the high-speed envelope detection circuit 2 with the slice level SD to output a defect detection signal DD.

Figure 2:
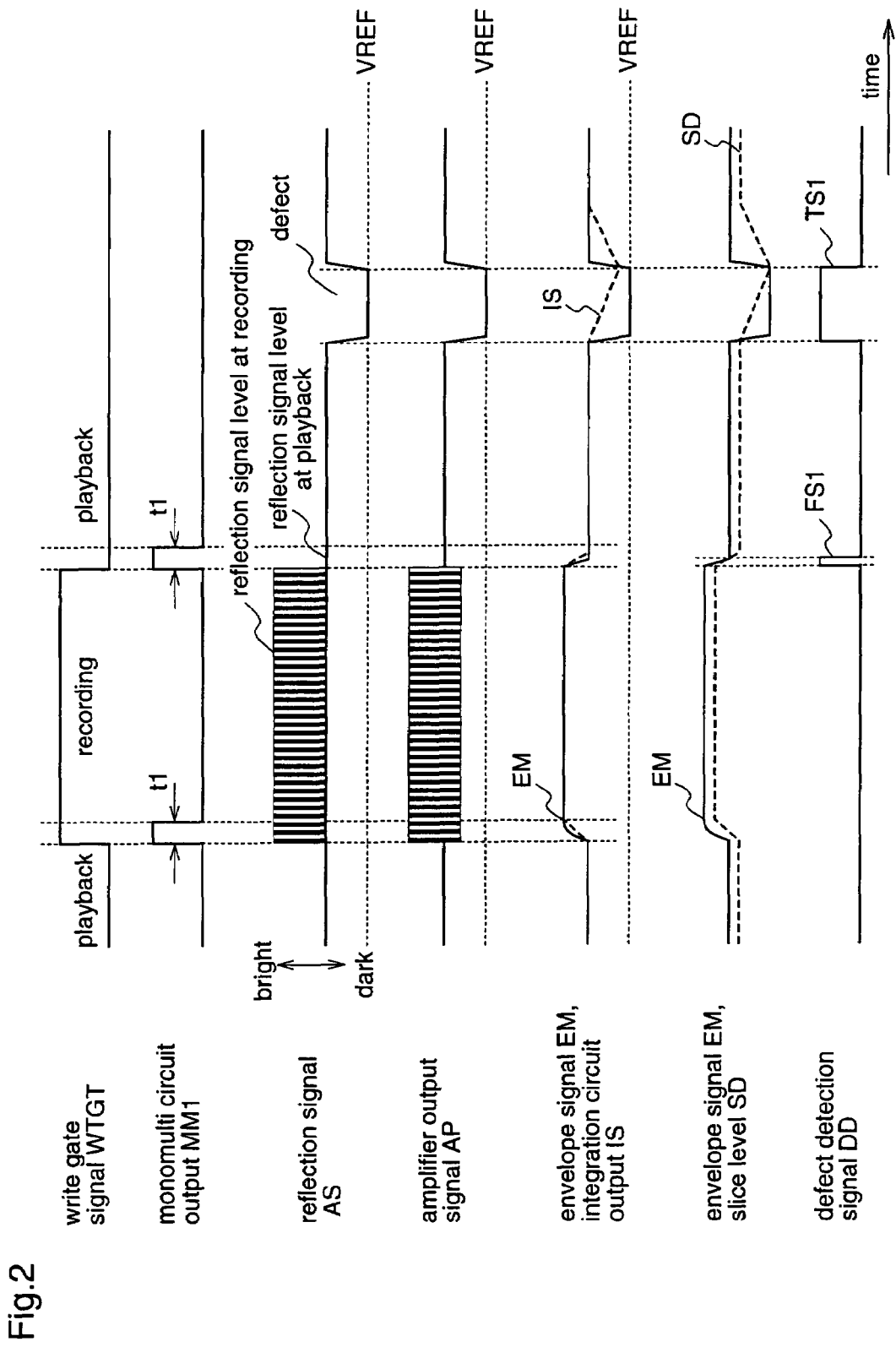
FIG. 2 is a diagram illustrating waveforms of the respective signals to be output in the defect detection apparatus according to the first embodiment.

Next, a description will be given of the operation of the defect detection apparatus constructed as described above, with reference to FIGS. 1 and 2. FIG. 2 shows the waveforms of the respective signals to be output in the defect detection apparatus shown in FIG. 1. Although the following description will be given of the case where the operation of the optical disc drive changes from playback to recording, the same holds true for the case where the operation of the optical disc drive changes from recording to playback.

Initially, for playback of the optical disc, a light beam is converged and applied onto the optical disc, and reflected at the optical disc. Each of plural photoreceptors (not shown) receives the reflected light, and converts the reflected light into an electric signal according to its intensity. The output signals from the photoreceptors are added, and a full-addition signal thus obtained is input to the variable gain amplifier 1 as a reflection signal AS.

When the write gate signal WTGT inputted to the variable gain amplifier 1 is "L", the variable gain amplifier 1 judges that the optical disc drive carries out playback, and amplifies the reflection signal AS with the gain being increased. When the operation of the optical disc is changed to recording, that is, when the inputted write gate signal WTGT changes to "H", the variable gain amplifier 1 amplifies the reflection signal AS with the gain being decreased, and outputs the signal to the subsequent high-speed envelope detection circuit 2. If the gain setting on the variable gain amplifier 1 varies and thereby the gain is not appropriate, there occurs a level difference between recording and playback as shown by the amplifier output signal AP in FIG. 2.

The high-speed envelope detection circuit 2 obtains the upper envelope of the amplifier output signal AP, and outputs the envelope signal EM to the integration circuit 5.

The integration circuit 5 integrates the envelope signal EM with a predetermined time constant during playback of the optical disc, and outputs the signal to the subsequent slice level setting circuit 6. However, during a predetermined period after the operation of the optical disc is changed from playback to recording, the integration circuit 5 integrates the envelope signal EM with the time constant being reduced as follows.

To be specific, initially, the edge detection circuit 3 detects that the write gate signal WTGT changes from "L" to "H", and outputs a pulse to the monomulti circuit 4. On receipt of the pulse from the edge detection circuit 3, the monomulti circuit 4 generates a pulse signal MM1 that is "H" during a period of time t1, and outputs the pulse signal MM1 to the switch 103 in the integration circuit 5.

On receipt of the output pulse MM1 from the monomulti circuit 4, which is "H", the switch 103 is turned on. Since the resistor 101 is short-circuited when the switch 103 is turned on, the time constant of the integration circuit 5 is reduced. As the result, the integration circuit 5 integrates the envelope signal EM with a time constant that is smaller than the usual time constant and outputs the output signal IS to the slice level setting circuit 6, during the period t1 when the output pulse MM1 from the monomulti circuit 4 is "H".

When the period t1 has passed, the output pulse MM1 from the monomulti circuit 4 becomes "L", and the switch 103 in the integration circuit 5 is turned off, whereby the integration circuit 5 integrates the envelope signal EM with the predetermined time constant, and outputs the output signal IS to the slice level setting circuit 6.

The slice level setting circuit 6 sets the slice level SD with reference to the output signal IS of the integration circuit 5, and outputs the slice level SD to the comparator 7. The comparator 7 binarizes the output signal EM of the high-speed envelope detection circuit 2 with reference to the slice level SD, and outputs the binarized signal as a defect detection signal DD.

As described above, in the defect detection apparatus according to the first embodiment, during a predetermined period after the operation of the optical disc drive has changed from playback to recording or from recording to playback, the envelope signal EM is integrated with the time constant of the integration circuit 5 being reduced so as to make the change in the waveform of the output signal IS from the integration circuit 5 speedily follow the change in the waveform of the envelope signal EM. Therefore, the output period of a false defect signal can be shortened, and defect detection can be speedily resumed immediately after the operation of the optical disc drive has changed.

Embodiment 2

Figure 3:
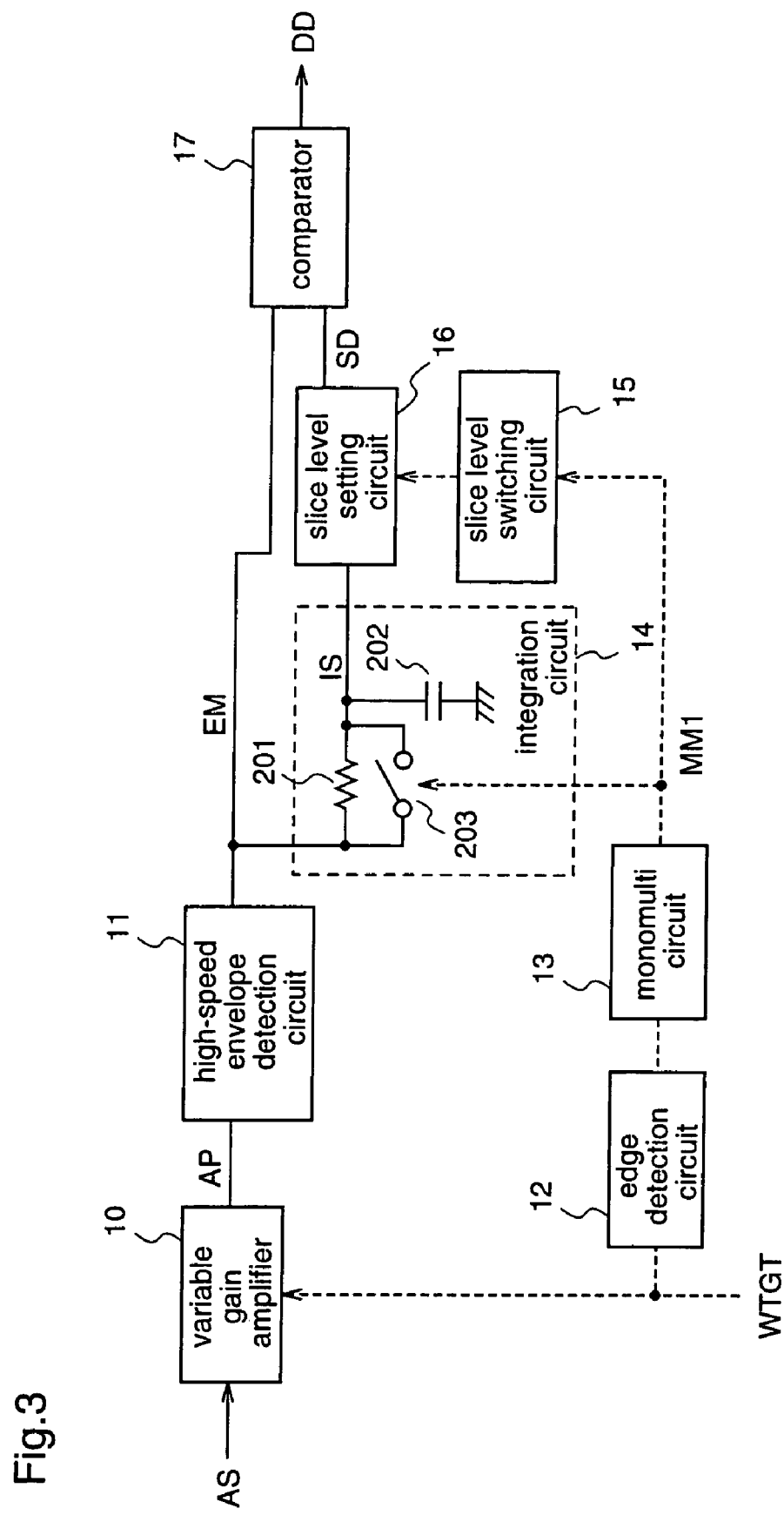
FIG. 3 is a block diagram illustrating a defect detection apparatus according to a second embodiment of the present invention.

FIG. 3 is a block diagram illustrating a defect detection apparatus according to a second embodiment of the present invention. In FIG. 3, a variable gain amplifier 10, a high-speed envelope detection circuit 11, an edge detection circuit 12, a monomulti circuit 13, an integration circuit 14, a slice level setting circuit 16, and a comparator 17 are identical to those of the defect detection apparatus according to the first embodiment, and therefore, repeated description is not necessary. In this second embodiment, a slice level switching circuit 15 instructs the slice level setting circuit 16 to set a slice level which is shifted toward a reference voltage VREF side relative to the normal slice level, during a period when the slice level switching circuit 15 receives the pulse signal MM1 outputted from the monomulti circuit 13.

Figure 4:
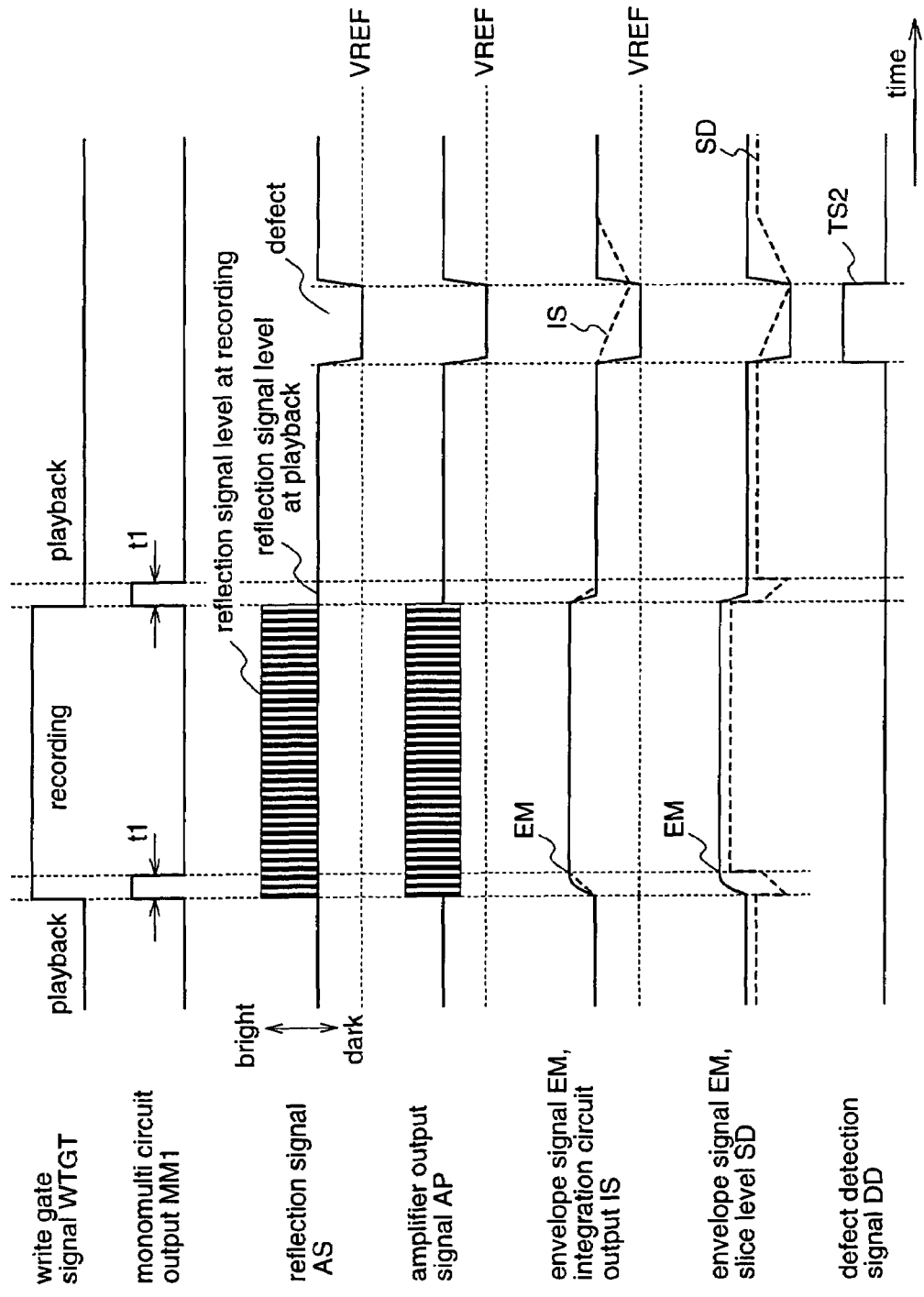
FIG. 4 is a diagram illustrating waveforms of the respective signals to be output in the defect detection apparatus according to the second embodiment.

Next, the operation of the defect detection apparatus constructed as described above will be described with reference to FIGS. 3 and 4. FIG. 4 shows the waveforms of the respective signals to be output in the defect detection apparatus shown in FIG. 3.

Initially, the reflection signal AS is input to the variable gain amplifier 10, and amplified by a predetermined amount according to the write gate signal WTGT. Then, the high-speed envelope detection circuit 11 detects the envelope signal EM, and outputs the envelope signal EM to the integration circuit 14. The integration circuit 14 integrates the envelope signal EM with a predetermined time constant. When the operation of the optical disc drive is changed from playback to recording or from recording to playback, the level of the write gate signal WTGT is changed, and the integration circuit 14 integrates the envelope signal EM with the time constant being reduced during a predetermined period t1 as in the first embodiment, and outputs the signal to the slice level setting circuit 16.

On the other hand, the slice level switching circuit 15 receives the pulse signal MM1 that is output from the monomulti circuit 13 when the write gate signal WTGT is changed, and instructs the slice level setting circuit 16 to shift the slice level toward the reference voltage VREF side during the period when the pulse signal is "H", i.e., the period t1 shown in figure 4. Thereby, the slice level setting circuit 16 shifts the slice level toward the reference voltage VREF side relative to the usual slice level during the period t1, and outputs the set slice level to the comparator 17. Since the switch 203 is turned off when the period t1 has passed, the integration circuit 14 integrates the envelope signal EM with the predetermined time constant, and outputs the signal to the slice level setting circuit 16. The slice level setting circuit 16 sets the slice level SD for normal recording, and outputs the slice level SD to the comparator 17.

During normal operation, the comparator 17 binarizes the envelope signal EM outputted from the high-speed envelope detection circuit 11 with reference to the predetermined slice level outputted from the slice level setting circuit 16. During a period t1 after the operation of the optical disc drive has changed, the comparator 17 binarizes the envelope signal EM with reference to the slice level that is shifted toward the reference voltage VREF side relative to the normal slice level, thereby to output a defect detection signal DD.

As described above, in the defect detection apparatus according to the second embodiment, during a predetermined period of time after the operation of the optical disc drive has changed from playback to recording or from recording to playback, the integration circuit 14 integrates the envelope signal EM with the time constant being reduced, and the slice level SD that is set on the basis of the output signal IS of the integration circuit 14 is shifted toward the reference voltage VREF side during this period. Therefore, the level of the envelope signal EM never become lower than the slice level SD during the predetermined period after the operation of the optical disc drive has changed, thereby reducing occurrence of false defect signals during this period.

Embodiment 3

Figure 5:
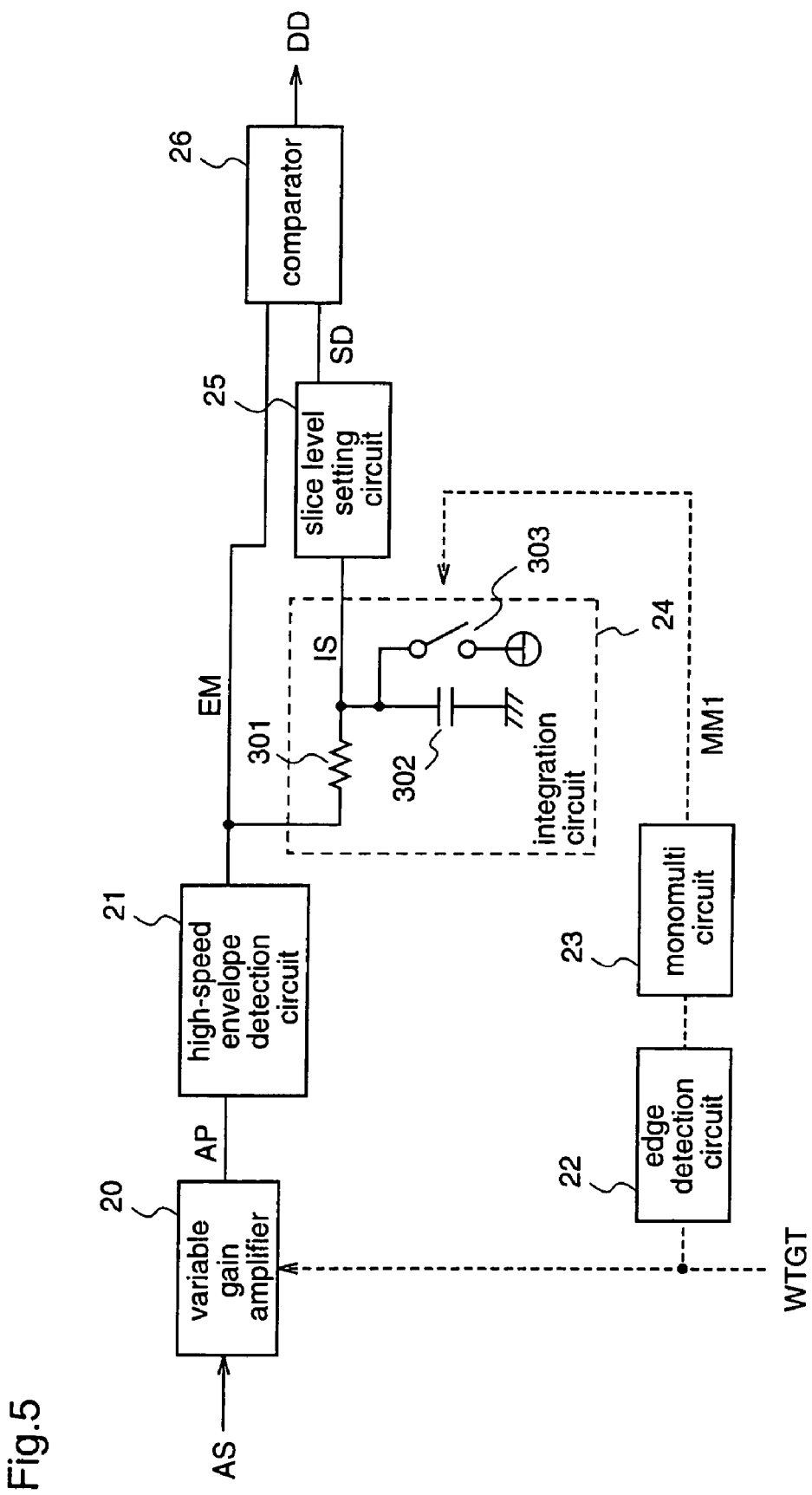
FIG. 5 is a block diagram illustrating a defect detection apparatus according to a third embodiment of the present invention.

FIG. 5 is a block diagram illustrating the construction of a defect detection apparatus according to a third embodiment of the present invention.

In FIG. 3, a variable gain amplifier 20, a high-speed envelope detection circuit 21, an edge detection circuit 22, a slice level setting circuit 25, and a comparator 26 are identical to those of the defect detection apparatus according to the first embodiment, and therefore, repeated description is not necessary. In this third embodiment, reference numeral 24 denotes an integration circuit for integrating the envelope signal EM outputted from the high-speed envelope detection circuit 21. The integration circuit 24 is provided with a resistor 301, a capacitor 302, and a switch 303. An end of the resistor 301 is supplied with the envelope signal EM, and the other end is connected to the slice level setting circuit 25, the capacitor 302, and the switch 303. An end of the switch 303 is connected to the reference voltage VREF, and the capacitor 302 is short-circuited with the reference voltage VREF when the switch 303 is turned on. The reference voltage VREF is a voltage toward which the level of the envelope signal EM is shifted during defect detection, and therefore, it should be set at a voltage lower than the voltage indicated by the envelope signal EM during defect detection. A monomulti circuit 23 outputs, to the switch 303, a pulse signal MM1 that becomes "H" for a predetermined period every time the output of the write gate signal WTGT changes. The switch 303 is controlled so as to turn on when the output pulse MM1 of the monomulti circuit 23 is "H", and turn off when the output pulse MM1 is "L".

Figure 6:
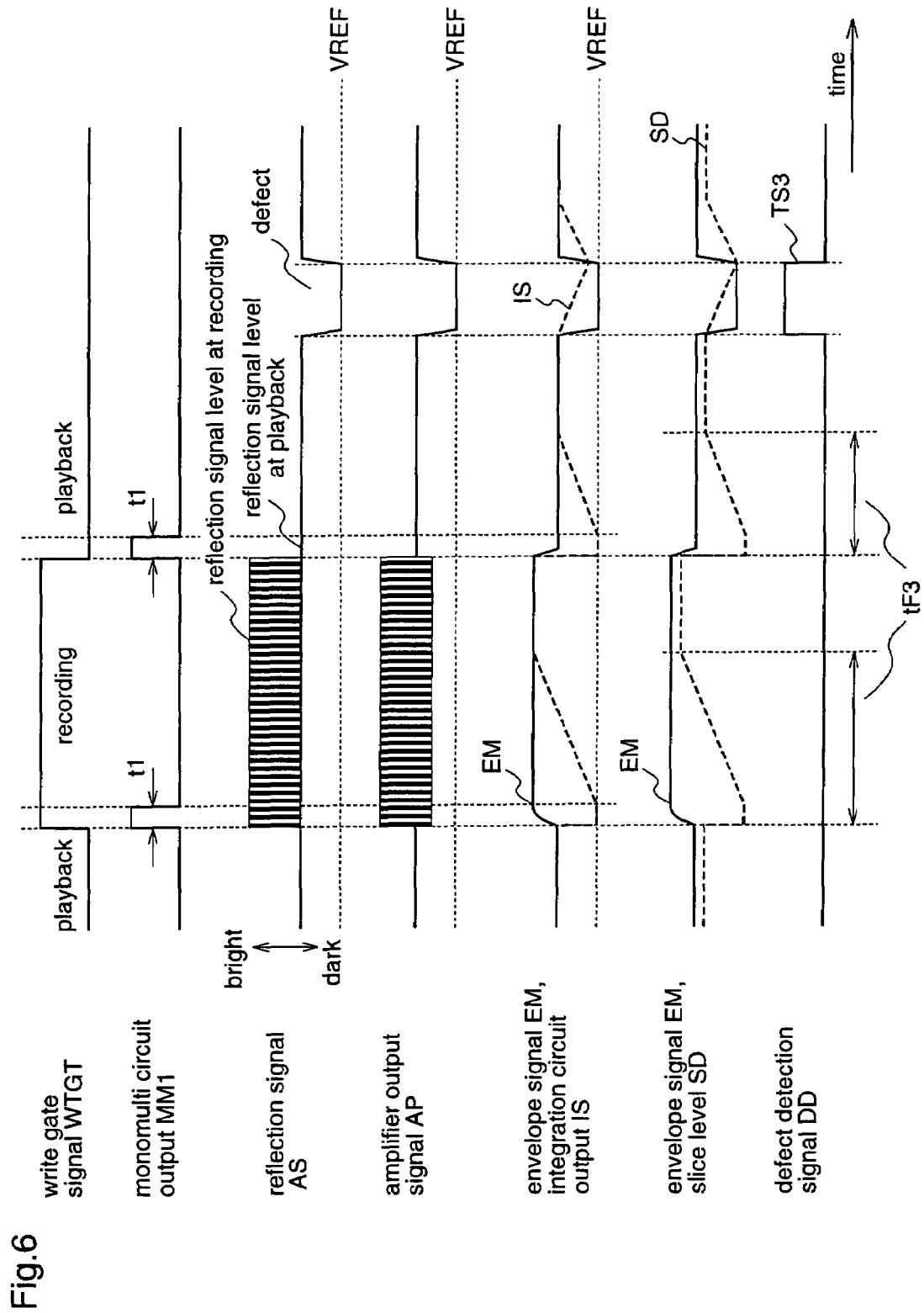
FIG. 6 is a diagram illustrating waveforms of the respective signals to be output in the defect detection apparatus according to the third embodiment.

Next, the operation of the defect detection apparatus constructed as described above will be described with reference to FIGS. 5 and 6. FIG. 6 shows the waveforms of the respective signals to be output in the defect detection apparatus shown in FIG. 5.

Initially, as described for the first embodiment, the reflection signal AS is input to the variable gain amplifier 20, and amplified by a predetermined amount according to the write gate signal WTGT. Then, the envelope signal EM is detected by the high-speed envelope detection circuit 21 and, thereafter, the envelope signal EM is output to the integration circuit 24.

When the operation of the optical disc drive is changed from playback to recording or from recording to playback, the level of the write gate signal WTGT is changed. On receipt of the level change of the write gate signal WTGT, the monomulti circuit 23 generates a pulse that becomes "H" during the period t1, and outputs the pulse to the switch 303 in the integration circuit 24.

The integration circuit 24 integrates the envelope signal EM with a predetermined time constant during playback of the optical disk. However, during the period t1 when the integration circuit 24 receives the output pulse MM1 from the monomulti circuit 23, the switch 303 of the integration circuit 24 is turned on and the capacitor 302 is short-circuited with the reference voltage VREF, whereby the output value of the integration circuit 24 is fixed to the reference voltage VREF as indicated in the output signal IS of the integration circuit shown in FIG. 6. When the time t1 has passed, since the switch 303 is turned off, the integration circuit 24 integrates the envelope signal EM with the predetermined time constant. Since the operation after the integration circuit 24 sends the output signal IS to the slice level setting circuit 25 is identical to that described for the first embodiment, repeated description is not necessary.

As described above, in the defect detection apparatus according to the third embodiment, during a predetermined period of time after the operation of the optical disc drive has changed from playback to recording or from recording to playback, the output of the integration circuit 2 is fixed to the reference voltage VREF, and the slice level SD is set on the basis of the output value. Therefore, the envelope signal EM is prevented from erroneously becoming lower than the slice level SD, thereby reducing occurrences of false defect signals during the period.

Embodiment 4

Figure 7:
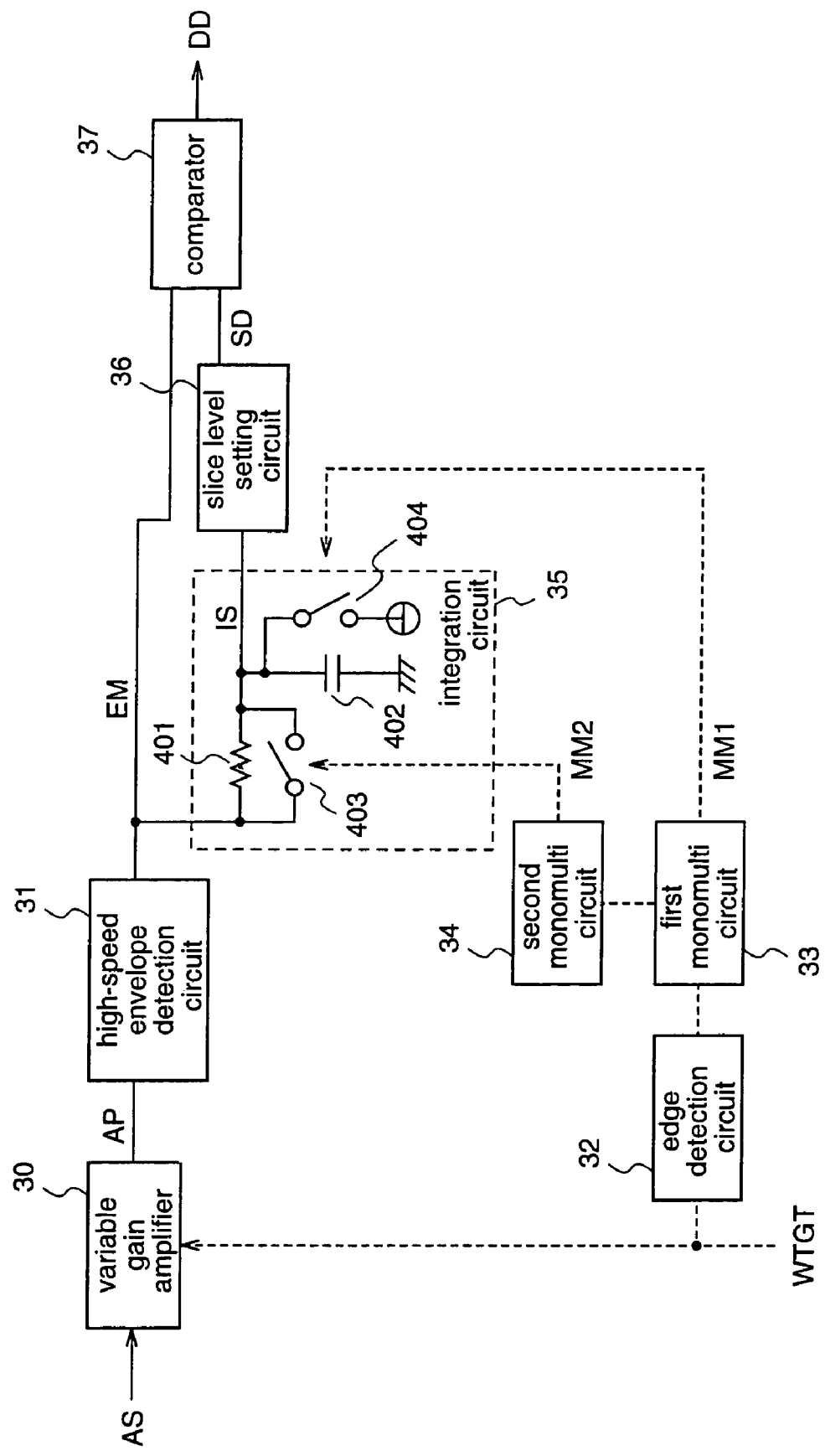
FIG. 7 is a block diagram illustrating a defect detection apparatus according to a fourth embodiment of the present invention.

FIG. 7 is a block diagram illustrating the construction of a defect detection apparatus according to a fourth embodiment of the present invention. In FIG. 7, a variable gain amplifier 30, a high-speed envelope detection circuit 31, an edge detection circuit 32, a slice level setting circuit 36, and a comparator 37 are identical to those of the defect detection apparatus according to the first embodiment, and therefore, repeated description is not necessary.

Reference numeral 33 denotes a first monomulti circuit 33 which generates a pulse signal MM1 that becomes "H" during a period t1, on receipt of the pulse outputted from the edge detection circuit 32, and outputs the pulse signal MM1 to a second monomulti circuit 34 described later, and to the integration circuit 35. The second monomulti circuit 34 receives the level change in the pulse signal MM1 outputted from the first monomulti circuit 33, generates a pulse signal MM2 that becomes "H" during a period t2, and outputs the pulse signal MM2 to the switch 404 in the integration circuit 35. That is, the second monomulti circuit 34 outputs the pulse signal MM2 to the switch 404 in the integration circuit 35 the moment when the first monomulti circuit 33 stops output of the pulse signal MM1. Reference numeral 35 denotes an integration circuit which integrates the envelope signal EM outputted from the high-speed envelope detection circuit 31. The integration circuit 35 is provided with a resistor 401, a capacitor 402, and switches 403 and 404. An end of the resistor 401 is supplied with the envelope signal EM, and the other end is connected to the slice level setting circuit 36, an end of the capacitor 402, and the switch 404. The switch 403 is connected in parallel to the resistor 401, and the resistor 401 is short-circuited when the switch 403 is turned on. An end of the switch 404 is connected to the resistor 401 and the capacitor 402, and the other end is connected to the reference voltage VREF. When the switch 403 is turned on, the capacitor 402 is short-circuited with the reference voltage VREF. The reference voltage VREF is a voltage toward which the level of the envelope signal EM is shifted during defect detection, and therefore, it should be set to a voltage lower than the voltage indicated by the envelope signal EM during defect detection. The switch 403 is controlled so as to turn on when the pulse signal MM2 outputted from the second monomulti circuit 34 is "H", and turn off when the pulse signal MM2 is "L". The switch 404 is controlled so as to turn on when the pulse signal MM1 outputted from the first monomulti circuit 33 is "H", and turned off when it is "L".

Figure 8:
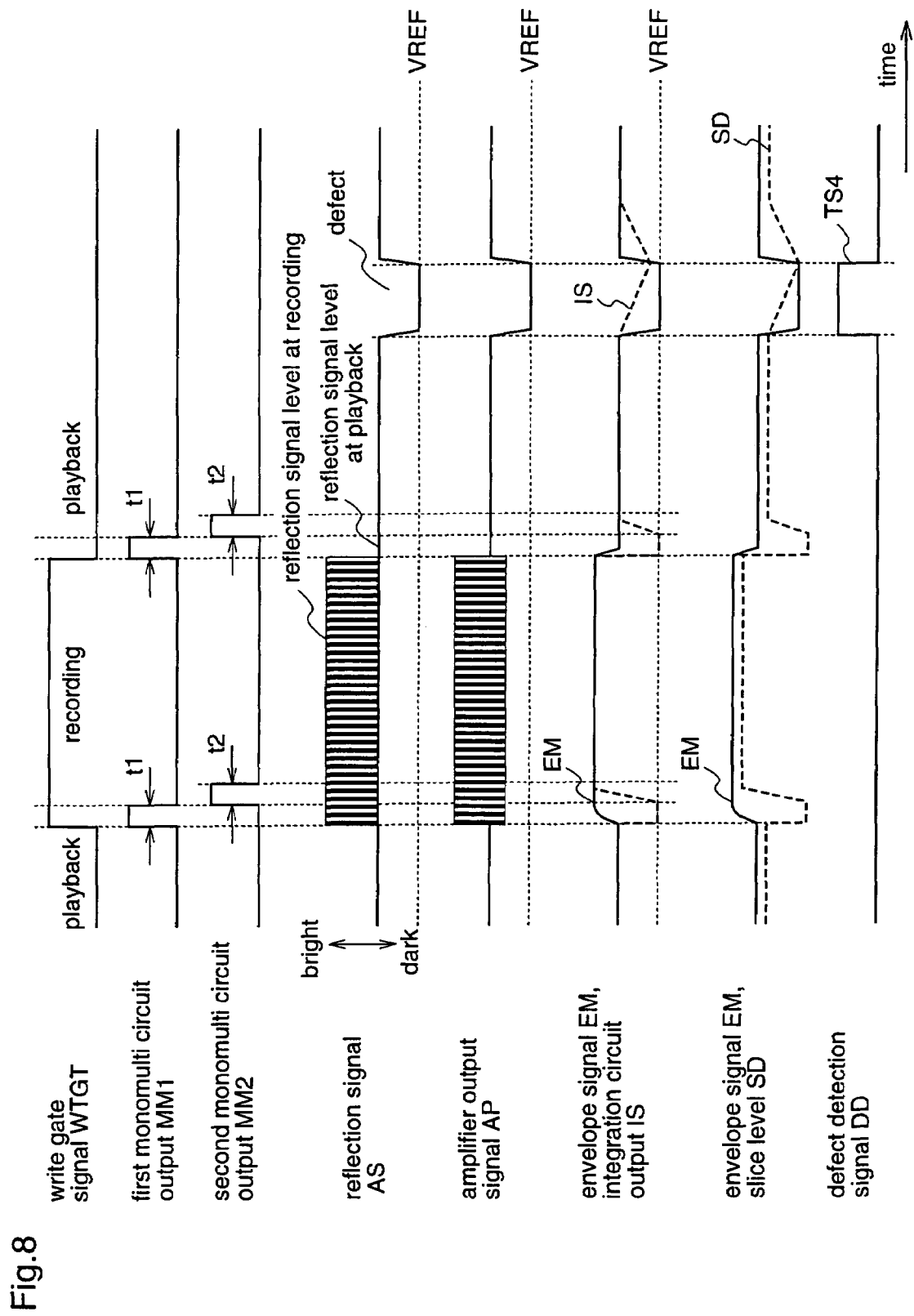
FIG. 8 is a diagram illustrating waveforms of the respective signals to be output in the defect detection apparatus according to the fourth embodiment.
Figure 9:
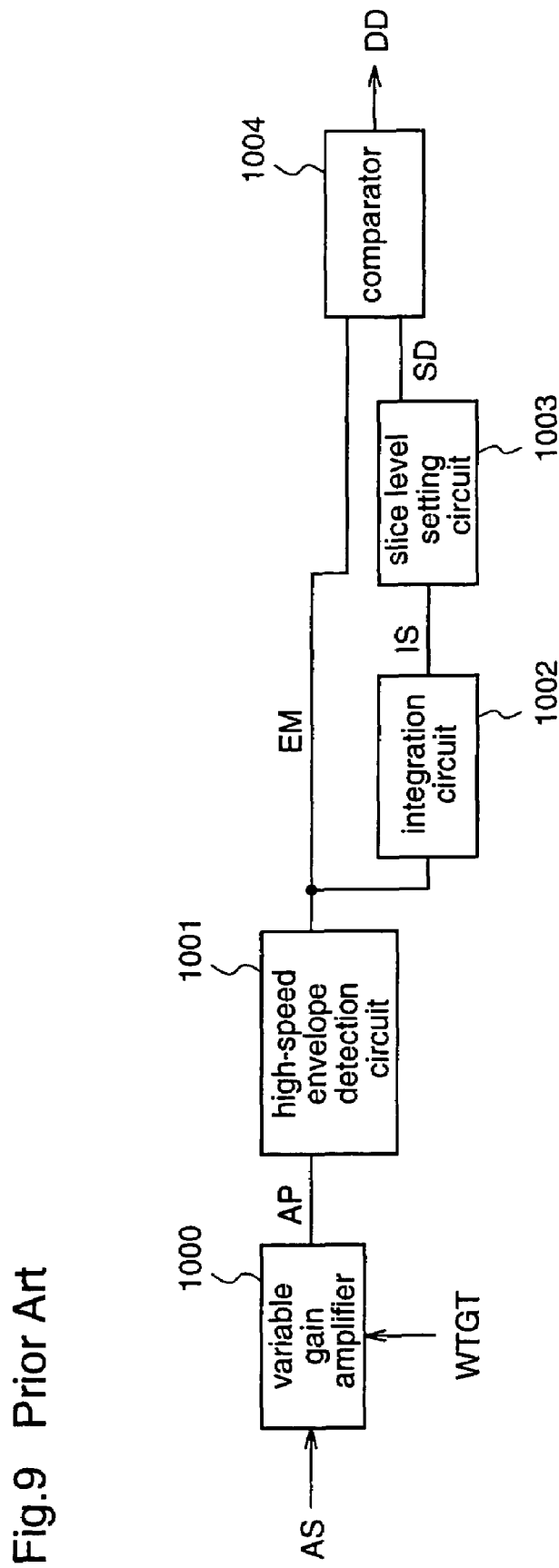
FIG. 9 is a block diagram illustrating the conventional defect detection apparatus.
Figure 10:
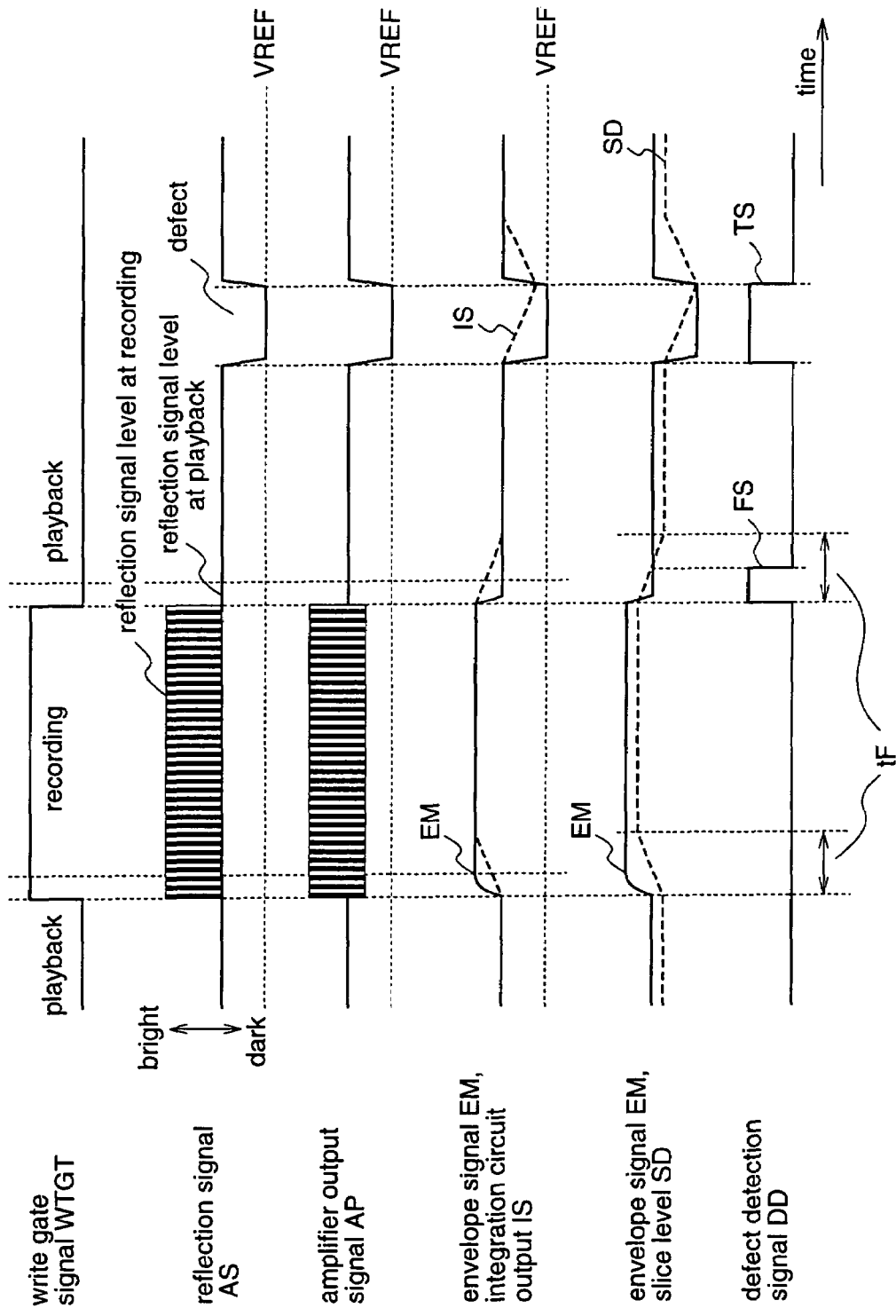
FIG. 10 is a diagram illustrating waveforms of the respective signals to be output in the conventional defect detection apparatus.

Next, the operation of the defect detection apparatus constructed as mentioned above will be described with reference to FIGS. 7 and 8. FIG. 8 shows the waveforms of the respective signals to be output in the defect detection apparatus shown in FIG. 7.

Initially, as described for the first embodiment, the reflection signal AS is input to the variable gain amplifier 30, and amplified by a predetermined amount according to the write gate signal WTGT. Then, the envelope signal EM is detected by the high-speed envelope detection circuit 31 and outputted to the integration circuit 35.

When the operation of the optical disc drive is changed from playback to recording or from recording to playback, the level of the write gate signal WTGT is changed. On receipt of the level change in the write gate signal WTGT, the first monomulti circuit 33 generates a pulse signal MM1 that becomes "H" during the period t1, and outputs the pulse signal MM1 to the second monomulti circuit 34 and to the switch 404 in the integration circuit 35.

Even when the second monomulti circuit 34 receives the pulse signal MM1, the second monomulti circuit 34 does not operate while the pulse signal MM1 is being outputted. On the other hand, the switch 404 in the integration circuit 35 is turned on, on receipt of the pulse signal MM1. Thereby, the capacitor 402 in the integration circuit 35 is short-circuited with the reference voltage VREF, and the output voltage of the integration circuit 35 is fixed to the reference voltage VREF during the period t1 as indicated by the output signal IS of the integration circuit shown in FIG. 8. When the period t1 has passed, the output of the pulse signal MM1 from the first monomulti circuit 33 is stopped. Thereby, the switch 404 in the integration circuit 35 is turned off, and the integration circuit 35 stops the output of the reference voltage VREF.

On the other hand, when the output of the pulse signal MM1 is stopped, the second monomulti circuit 34 outputs the pulse signal MM2 that becomes "H" during the time t2 to the switch 403 in the integration circuit 35, whereby the switch 403 is turned on. Then, the resistor 401 is short-circuited, and the time constant of the integration circuit 35 is reduced. As a result, the output signal IS of the integration circuit 35 rapidly approaches the envelope signal EM. When the period t2 has passed, the second monomulti circuit 34 stops the output of the pulse signal MM2, whereby the switch 403 is turned off. Then, the integration circuit 35 integrates the envelope signal EM with the predetermined time constant. Since the operation after the integration circuit 35 outputs the output signal IS to the slice level setting circuit 36 is identical to that described for the first embodiment, repeated description is not necessary.

As described above, in the defect detection apparatus according to the fourth embodiment, during a predetermined period after the operation of the optical disc drive has changed from playback to recording or from recording to playback, the output of the integration circuit 35 is fixed to the reference voltage VREF, and the slice level SD is set on the basis of the output value. Therefore, the envelope signal EM is prevented from erroneously becoming lower than the slice level SD, thereby reducing occurrence of false defect signals during this period.

Furthermore, during a predetermined period after the end of the above-mentioned period, the time constant of the integration circuit 35 is reduced so that the change in the waveform of the output signal IS from the integration circuit 35 speedily follows the change in the waveform of the envelope signal, whereby defect detection can be rapidly restarted.

An optical disc drive capable of stable recording and playback is realized when it is provided with the defect detection apparatus according to the present invention.

What is claimed is:

1. A defect detection apparatus comprising:
    an amplifier circuit for amplifying a reflection signal which is obtained according to the intensity of reflected light of a light beam that is applied onto an optical disc, on the basis of a control signal indicating whether an optical disc drive performs playback or recording, with a gain according to the operation of the optical disc drive;
    an envelope detection circuit for obtaining an envelope of an output signal of the amplifier circuit;
    a first pulse generation circuit for outputting a pulse of a predetermined length every time the control signal is changed;
    an integration circuit for integrating the output signal of the envelope detection circuit with a predetermined time constant, with its output value being changed during a period when it receives the pulse outputted from the first pulse generation circuit;
    a slice level setting circuit for setting, on the basis of an output signal from the integration circuit, a slice level used when detecting a defect detection signal indicating presence/absence of a defect on the optical disc; and
    a comparator for comparing the output signal of the envelope detection circuit with the slice level, to output the defect detection signal.

2. A defect detection apparatus as defined in claim 1 wherein said integration circuit includes a resistor, and output a signal that is obtained by integrating the envelope signal from the envelope detection circuit with a time constant obtained by short-circuiting the resistor, during a period when the integration circuit receives the pulse outputted from the first pulse generation circuit.

3. A defect detection apparatus as defined in claim 2 wherein said integration circuit includes a switch which is connected in parallel to the resistor, and controlled by the pulse outputted from the first pulse generation circuit.

4. A defect detection apparatus as defined in claim 3 further including a slice level switching circuit for changing the slice level that is set by the slice level setting circuit to a predetermined slice level, during a period when the slice level switching circuit receives the pulse outputted from the first pulse generation circuit.

5. A defect detection apparatus as defined in claim 1 wherein said integration circuit includes a capacitor, and outputs a predetermined reference voltage by short-circuiting the capacitor, during a period when the integration circuit receives the pulse outputted from the first pulse generation circuit.

6. A defect detection apparatus as defined in claim 5 wherein said integration circuit includes a switch which is located between the capacitor and the predetermined reference voltage, and controlled by the pulse outputted from the first pulse generation circuit.

7. A defect detection apparatus as defined in claim 1 further including a second pulse generation circuit for outputting a pulse of a predetermined length when the first pulse generation circuit has finished outputting the pulse;
    wherein said integration circuit includes a resistor and a capacitor, and outputs a predetermined reference voltage by short-circuiting the capacitor during a period when it receives the pulse outputted from the first pulse generation circuit, and output a signal that is obtained by integrating the envelope signal from the envelope detection circuit with the time constant obtained by short-circuiting the resistor during a period when it receives the pulse outputted from the second pulse generation circuit.

8. A defect detection apparatus as defined in claim 7 wherein said integration circuit includes:
    a switch that is located between the capacitor and the predetermined reference voltage, and controlled by the pulse outputted from the first pulse generation circuit; and
    a switch that is connected in parallel to the resistor, and controlled by the pulse outputted from the second pulse generation circuit.

* * * * *